US012703312B2

(12) United States Patent
Suzuki

(10) Patent No.: US 12,703,312 B2
(45) Date of Patent: Aug. 11, 2026

(54) IN-VEHICLE EQUIPMENT SETUP DEVICE, IN-VEHICLE EQUIPMENT SETUP METHOD, AND STORAGE MEDIUM

(71) Applicant: HONDA MOTOR CO., LTD., Tokyo (JP)

(72) Inventor: Tomohiro Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 69 days.

(21) Appl. No.: 18/585,097

(22) Filed: Feb. 23, 2024

(65) Prior Publication Data

US 2024/0308444 A1 Sep. 19, 2024

(30) Foreign Application Priority Data

Mar. 13, 2023 (JP) ................................ 2023-038823

(51) Int. Cl.
*B60R 16/023* (2006.01)
*B60H 1/00* (2006.01)
*B60R 16/037* (2006.01)

(52) U.S. Cl.
CPC ....... *B60R 16/0231* (2013.01); *B60H 1/0073* (2019.05); *B60R 16/037* (2013.01)

(58) Field of Classification Search
CPC . B60R 16/0231; B60R 16/037; B60H 1/0073; B60H 2001/00733
See application file for complete search history.

(56) References Cited

U.S. PATENT DOCUMENTS 10,272,742 B2 * 4/2019 Chavez Hernandez ..................... B60K 35/22
2007/0021893 A1 * 1/2007 Ikeda .................. B60R 25/2081 701/49

(Continued)

FOREIGN PATENT DOCUMENTS

JP 2010-000885 1/2010
JP 2010000885 A * 1/2010

(Continued)

OTHER PUBLICATIONS

Machine Translation of Okabe's reference (JP-2010000885-A) (Year: 2010).*

(Continued)

*Primary Examiner* — Tarek Elarabi
(74) *Attorney, Agent, or Firm* — Amin, Turocy & Watson, LLP

(57) ABSTRACT

An in-vehicle equipment setup device includes: a storage configured to store user setting information; a setter configured to set a set value indicated by the setting information for the corresponding in-vehicle equipment; and an updater configured to acquire a current set value from the in-vehicle equipment and to update the set value indicated by the setting information with the acquired current set value, in which the setter sets the set value indicated by the setting information correlated with current user setting information which is the user setting information corresponding to a current user selected as the user who currently uses the vehicle as a reproduction set value for reproducing previous settings in the corresponding in-vehicle equipment for the corresponding in-vehicle equipment, and the updater updates the set value set for the corresponding in-vehicle equipment as the reproduction set value in the setting information with the acquired current set value.

7 Claims, 6 Drawing Sheets

(56) References Cited

U.S. PATENT DOCUMENTS

| | | | | |
|---|---|---|---|---|
| 2010/0036560 | A1* | 2/2010 | Wright | B60R 16/037 701/36 |
| 2013/0166106 | A1* | 6/2013 | Nakagawa | G06F 17/00 701/2 |
| 2020/0148026 | A1* | 5/2020 | Cho | B60H 1/00807 |
| 2020/0269809 | A1* | 8/2020 | Sanji | B60R 25/31 |
| 2020/0353882 | A1* | 11/2020 | Beiser | G06Q 20/363 |
| 2021/0276501 | A1* | 9/2021 | Li | B60R 16/037 |
| 2024/0300431 | A1* | 9/2024 | Yamaguchi | |
| 2025/0020348 | A1* | 1/2025 | Ohta | F24F 11/64 |
| 2025/0021349 | A1* | 1/2025 | Hirano | G06F 9/448 |

FOREIGN PATENT DOCUMENTS

| | | |
|---|---|---|
| JP | 2020-025194 | 2/2020 |
| JP | 2022-152073 | 10/2022 |

OTHER PUBLICATIONS

Japanese Office Action for Japanese Patent Application No. 2023-038823 mailed Jan. 7, 2025.

* cited by examiner

| USER | IN-VEHICLE EQUIPMENT | SETTING ITEM | SET VALUE |
|---|---|---|---|
| NEWLY REGISTERED USER | AIR CONDITIONING SYSTEM | TEMPER-ATURE | INITIAL VALUE |
| | | WIND VOLUME | INITIAL VALUE |
| | | WIND DIRECTION | NON-SET |
| | ... | ... | ... |

ACQUISITION OF CURRENT SET VALUE
(TEMPERATURE:25°C
WIND VOLUME:5
WIND DIRECTION:FACE)

(b)

| USER | IN-VEHICLE EQUIPMENT | SETTING ITEM | SET VALUE |
|---|---|---|---|
| NEWLY REGISTERED USER | AIR CONDITIONING SYSTEM | TEMPER-ATURE | 25°C |
| | | WIND VOLUME | INITIAL VALUE |
| | | WIND DIRECTION | FACE |
| | ... | ... | ... |

REQUEST FOR CURRENT SET VALUE, ACQUISITION OF CURRENT SET VALUE (c)

| USER | IN-VEHICLE EQUIPMENT | SETTING ITEM | SET VALUE |
|---|---|---|---|
| NEWLY REGISTERED USER | AIR CONDITIONING SYSTEM | TEMPER-ATURE | 25°C |
| | | WIND VOLUME | 5 |
| | | WIND DIRECTION | FACE |
| | ... | ... | ... |

| USER | IN-VEHICLE EQUIPMENT | SETTING ITEM | SET VALUE |
| --- | --- | --- | --- |
| A | AIR CONDITIONING SYSTEM | TEMPER-ATURE | 25°C |
| | | WIND VOLUME | 5 |
| | | WIND DIRECTION | FACE |
| | … | … | … |

ACQUISITION OF CURRENT SET VALUE
(OPERATION BY USER
TEMPERATURE: 25°C
WIND VOLUME: 3
WIND DIRECTION: FACE + FEET)

(b)

| USER | IN-VEHICLE EQUIPMENT | SETTING ITEM | SET VALUE |
| --- | --- | --- | --- |
| A | AIR CONDITIONING SYSTEM | TEMPER-ATURE | 25°C |
| | | WIND VOLUME | 3 |
| | | WIND DIRECTION | FACE |
| | … | … | … |

REQUEST FOR CURRENT SET VALUE, ACQUISITION OF CURRENT SET VALUE (c)

| USER | IN-VEHICLE EQUIPMENT | SETTING ITEM | SET VALUE |
| --- | --- | --- | --- |
| A | AIR CONDITIONING SYSTEM | TEMPER-ATURE | 25°C |
| | | WIND VOLUME | 3 |
| | | WIND DIRECTION | FACE + FEET |
| | … | … | … |

IN-VEHICLE EQUIPMENT SETUP DEVICE, IN-VEHICLE EQUIPMENT SETUP METHOD, AND STORAGE MEDIUM

CROSS-REFERENCE TO RELATED APPLICATION

Priority is claimed on Japanese Patent Application No. 2023-038823, filed Mar. 13, 2023, the content of which is incorporated herein by reference.

BACKGROUND OF THE INVENTION

Field of the Invention

The present invention relates to an in-vehicle equipment setup device, an in-vehicle equipment setup method, and a storage medium.

Description of Related Art

In the related art, techniques of setting settings for operating a variety of in-vehicle equipment mounted in a vehicle for each user of the vehicle are disclosed (for example, see Japanese Unexamined Patent Application, First Publication No. 2022-152073). Recently, settings of in-vehicle equipment have been set according to a user carrying a wireless portable key in cooperation with the portable key such as a smart key.

In the related art, for example, when set values of a temperature, a wind volume, and the like in an air conditioner are set according to individual settings correlated with a user and a new user is registered in a setting device of the vehicle or a registered user is selected, the setting device acquires set values which are currently set in the air conditioner and performs registration of individual settings of the new user or updating of individual settings of the selected user. However, it is conceivable that the setting device does not acquire current set values from the air conditioner for certain reasons at the time of registration of a new user or selection of a registered user. In this case, when the user does not perform an operation of changing settings on the air conditioner, individual settings are not updated from initial values or previous set values. A case in which updating of individual settings is hindered in this way is not considered in the related art. That is, in the related art, there is room for improvement in convenience for a user.

The present invention was made in consideration of the aforementioned circumstances and an objective thereof is to provide an in-vehicle equipment setup device, an in-vehicle equipment setup method, and a storage medium that can suitably register and manage settings of each user for in-vehicle equipment. That is, an objective of the present invention is to improve convenience by registering settings for in-vehicle equipment according to a user. An objective of the present invention is to contribute to development of a sustainable transportation system by further improving traffic safety.

SUMMARY OF THE INVENTION

An in-vehicle equipment setup device, an in-vehicle equipment setup method, and a storage medium according to the present invention employ the following configurations.

(1) According to an aspect of the present invention, there is provided an in-vehicle equipment setup device for correlating setting information on settings for in-vehicle equipment mounted in a vehicle with each user of the vehicle, the in-vehicle equipment setup device including: a storage configured to store user setting information in which the setting information desired by each user is correlated with the user; a setter configured to set a set value indicated by the setting information correlated with the user setting information for the corresponding in-vehicle equipment; and an updater configured to acquire a current set value which is a set value currently set from the in-vehicle equipment and to update the set value indicated by the setting information correlated with the user setting information with the acquired current set value, wherein the setter sets the set value indicated by the setting information correlated with current user setting information which is the user setting information corresponding to a current user selected as the user who currently uses the vehicle as a reproduction set value for reproducing previous settings in the corresponding in-vehicle equipment for the corresponding in-vehicle equipment, and the updater updates the set value set for the corresponding in-vehicle equipment as the reproduction set value in the setting information correlated with the current user setting information with the acquired current set value.

(2) In the aspect of (1), the in-vehicle equipment setup device further includes a communicator configured to communicate with the in-vehicle equipment, and the updater acquires the current set value via the communicator.

(3) In the aspect of (2), the updater acquires the current set value after setting of the reproduction set value for the corresponding in-vehicle equipment has been completed by the setter and updates the set value set for the corresponding in-vehicle equipment as the reproduction set value with the acquired current set value.

(4) In the aspect of (2), the updater acquires a changed set value which is the changed current set value when the current set value has been changed through the current user's operation on the in-vehicle equipment and updates the set value set for the corresponding in-vehicle equipment as the reproduction set value with the acquired changed set value.

(5) In the aspect of (4), when there is a current set value which is not acquirable, the updater repeatedly acquires the current set value which is not acquirable.

(6) In the aspect of (5), the reproduction set value includes a set value which is an initial value or a set value in a non-set state in which there is no set value.

(7) According to another aspect of the present invention, there is provided an in-vehicle equipment setup method that is performed by a computer of an in-vehicle equipment setup device for correlating setting information on settings for in-vehicle equipment mounted in a vehicle with each user of the vehicle, the in-vehicle equipment setup method including: setting a set value indicated by the setting information correlated with current user setting information, which is user setting information corresponding to a current user selected as the user who currently uses the vehicle out of the user setting information in which the setting information desired by each user is correlated with the user, as a reproduction set value for reproducing previous settings for the corresponding in-vehicle equipment for the corresponding in-vehicle equipment; acquiring a current set value which is a set value currently set from the in-vehicle equipment; and updating the set value set for the corresponding in-vehicle equipment as the reproduction set value in the setting information correlated with the current user setting information with the acquired current set value.

(8) According to another aspect of the present invention, there is provided a non-transitory computer-readable storage medium storing a program, the program causing a computer of an in-vehicle equipment setup device for correlating setting information on settings for in-vehicle equipment mounted in a vehicle with each user of the vehicle to perform: setting a set value indicated by the setting information correlated with current user setting information, which is user setting information corresponding to a current user selected as the user who currently uses the vehicle out of the user setting information which is stored in a storage and in which the setting information desired by each user is correlated with the user, as a reproduction set value for reproducing previous settings for the corresponding in-vehicle equipment for the corresponding in-vehicle equipment; acquiring a current set value which is a set value currently set from the in-vehicle equipment; and updating the set value set for the corresponding in-vehicle equipment as the reproduction set value in the setting information correlated with the current user setting information with the acquired current set value.

According to the aspects of (1) to (8), it is possible to provide an in-vehicle equipment setup device, an in-vehicle equipment setup method, and a storage medium that suitably register and manage settings of each user for in-vehicle equipment.

BRIEF DESCRIPTION OF THE DRAWINGS

FIG. 4 is a diagram illustrating an example of user setting information which is updated by the in-vehicle equipment setup device according to the embodiment.

FIG. 6 is a diagram illustrating another example of user setting information which is updated by the in-vehicle equipment setup device according to the embodiment.

DETAILED DESCRIPTION OF THE INVENTION

Hereinafter, an in-vehicle equipment setup device, an in-vehicle equipment setup method, and a storage medium according to an embodiment of the present invention will be described with reference to the accompanying drawings. As used throughout this disclosure, the singular forms “a,” “an,” and “the” include plural reference unless the context clearly dictates otherwise.

Figure 1:
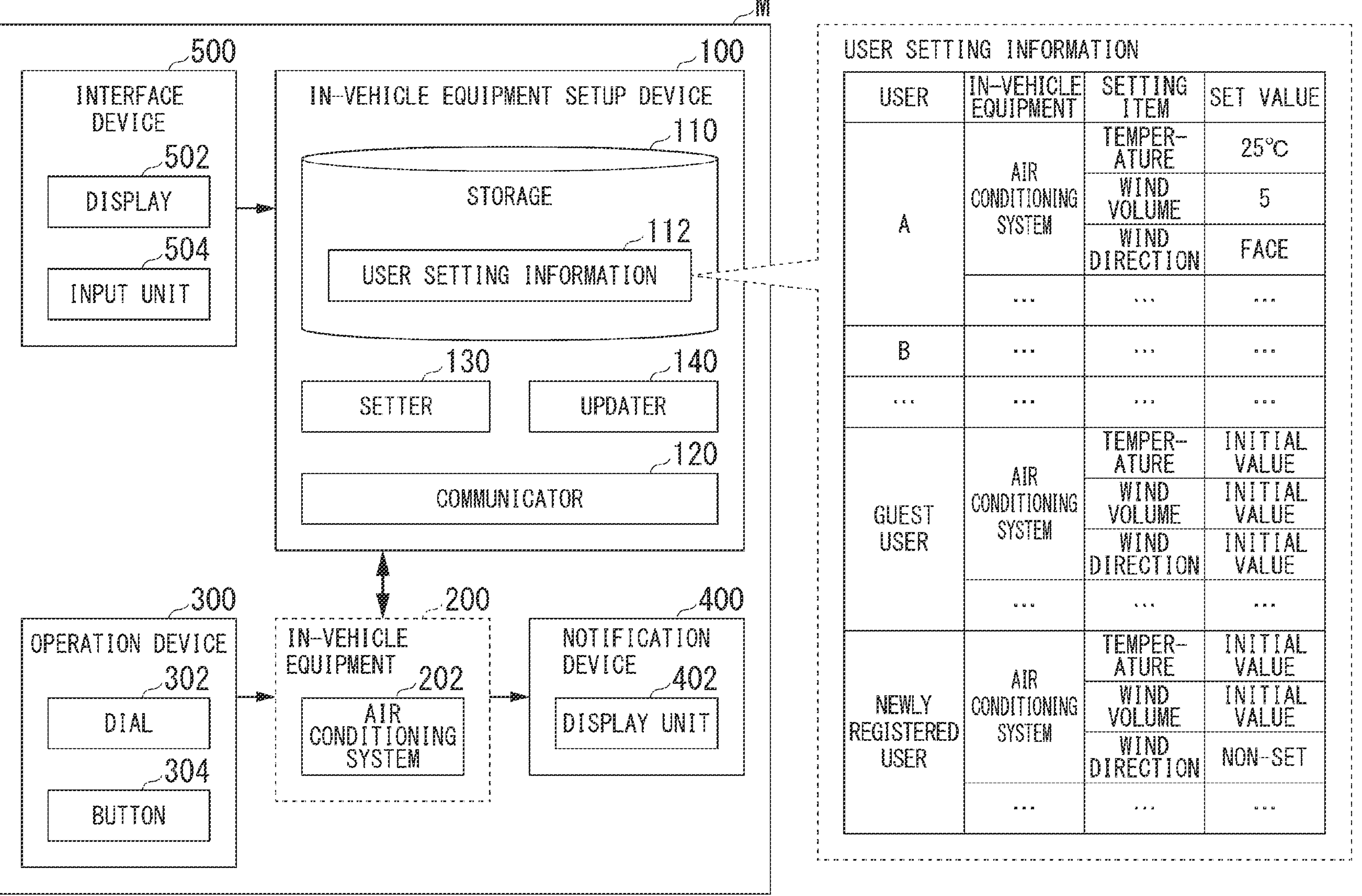
FIG. 1 is a diagram illustrating an example of a configuration and a usage environment of an in-vehicle equipment setup device according to an embodiment.

FIG. 1 is a diagram illustrating an example of a configuration and a usage environment of an in-vehicle equipment setup device according to an embodiment. The in-vehicle equipment setup device 100 is a device that sets or controls in-vehicle equipment 200 mounted in a vehicle M. In FIG. 1, an air conditioning system 202 is illustrated as an example of the in-vehicle equipment 200.

The air conditioning system 202 is an air conditioning device such as an air conditioner, and the temperature, the wind volume, and the like thereof are set and controlled by a user. FIG. 1 illustrates an example of in which a dial 302 and a button 304 which are used for a user to change settings or control of the air conditioning system 202 are provided as an operation device 300. The dial 302 is disposed, for example, at a position close to the air conditioning system 202 and is rotated by a user to perform setting or control of the air conditioning system 202. The button 304 is disposed, for example, at a position close to the air conditioning system 202 and is pressed by a user to perform setting or control of the air conditioning system 202. The air conditioning system 202 notifies a user of settings or a control state based on the user’s operation on the dial 302 or the button 304 via a notification device 400. FIG. 1 illustrates an example in which a display unit 402 is provided as the notification device 400. The display unit 402 is disposed at a position close to the dial 302 or the button 304 and visually notifies the user of a situation in which the settings or the control state of the air conditioning system 202 is changed by allowing the user to operate the dial 302 or the button 304. When the settings or the control state is changed by the user, the air conditioning system 202 outputs information of the changed set values to the in-vehicle equipment setup device 100.

In FIG. 1, the air conditioning system 202 is illustrated as the in-vehicle equipment 200 mounted in the vehicle M, but the in-vehicle equipment 200 is not limited to the air conditioning system 202. That is, instead of or in addition to the air conditioning system 202, other in-vehicle equipment may be included as the in-vehicle equipment 200 mounted in the vehicle M. In this case, when settings or a control state of the other in-vehicle equipment is changed by the user, information of the changed set values is also output to the in-vehicle equipment setup device 100.

The in-vehicle equipment setup device 100 manages set values output from the in-vehicle equipment 200 (the air conditioning system 202 herein) mounted in the vehicle M for each user. That is, the in-vehicle equipment setup device 100 manages the set values of the air conditioning system 202 when settings or the control state has been changed by a user operating the operation device 300 in correlation with the user having changed the settings or control of the air conditioning system 202.

Accordingly, the in-vehicle equipment setup device 100 recognizes (identifies) a user who has changed or is likely to change the settings or control of the air conditioning system 202. A process of recognizing (identifying) a user is performed, for example, by an in-vehicle equipment control device (not illustrated) that controls various operations (which include the operation of the in-vehicle equipment 200) in the vehicle M. FIG. 1 illustrates an example in which a display 502 and an input unit 504 are provided as an interface device 500 for recognizing (identifying) a user who has changed or is likely to change the settings or control of the air conditioning system 202. The interface device 500 is disposed, for example, in a center console or on a dashboard in the vicinity of the center in a vehicle width direction of the vehicle M and is configured as a touch panel through combination of the display 502 and the input unit 504. The display 502 includes a display device such as a liquid crystal display (LCD). The input unit 504 includes a detector such as a pressing force sensor for detecting a user's operation on a screen of the display 502. When a user is in the vehicle M, the in-vehicle equipment control device which is not illustrated displays a selection screen in which selection buttons for selecting a user of the vehicle M are provided on the display 502 and recognizes (identifies) a user who is currently in the vehicle M by allowing the user to operate the selection buttons (for example, a tapping operation or a long pressing operation) on the screen of the display 502. The in-vehicle equipment control device which is not illustrated may recognize (identify) a user correlated with a wireless portable key as a user who is currently in the vehicle M in cooperation with the wireless portable key such as a smart key when the user carrying the portable key is in the vehicle M. The in-vehicle equipment setup device 100 acquires information of the user recognized (identified) by the in-vehicle equipment control device which is not illustrated. The in-vehicle equipment setup device 100 manages the set values of the air conditioning system 202 for each user by correlating the user indicated by the acquired information of the user with the set values of the air conditioning system 202.

Figure 2:
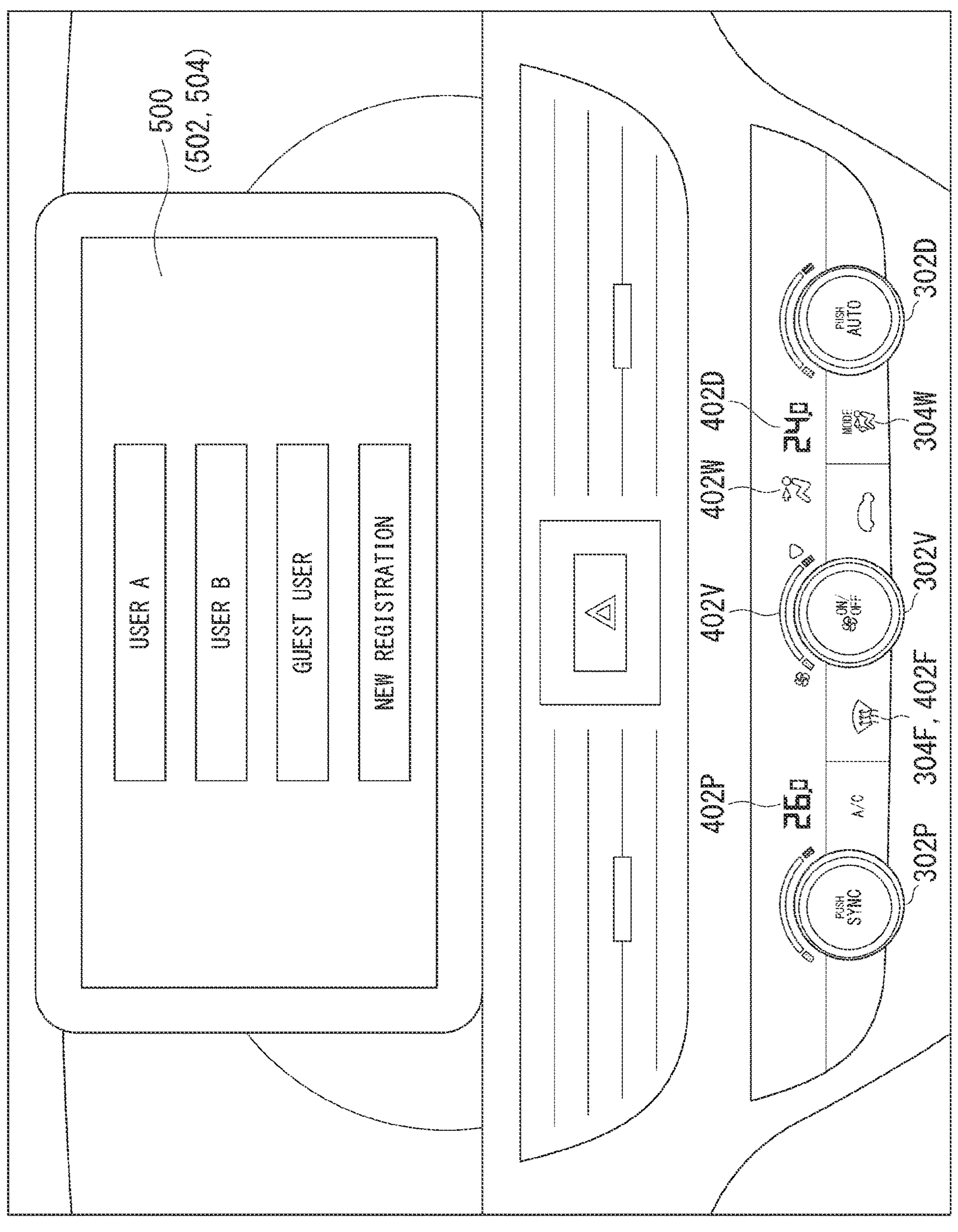
FIG. 2 is a diagram illustrating an example of an operation environment of in-vehicle equipment which is set by the in-vehicle equipment setup device according to the embodiment.

FIG. 2 is a diagram illustrating an example of an operation environment of the in-vehicle equipment 200 (the air conditioning system 202) which is set by the in-vehicle equipment setup device 100 according to the embodiment. FIG. 2 illustrates an example in which a dial 302D, a dial 302P, and a dial 302V are provided as the dial 302 included in the operation device 300 and a button 304W and a button 304F are provided as the button 304 included in the operation device 300. FIG. 2 illustrates an example in which a display unit 402D, a display unit 402P, a display unit 402V, a display unit 402W, and a display unit 402F are provided as the display unit 402 included in the notification device 400.

The dial 302D is a temperature setting dial for setting (changing) the temperature of a driver's seat side of the vehicle M which is adjusted by the air conditioning system 202 by allowing a user to rotate the dial 302D and notifies the user of the temperature set (changed) by the user operating the dial 302D by displaying the temperature on the display unit 402D. The dial 302P is a temperature setting dial for setting (changing) the temperature of a passenger's seat side of the vehicle M which is adjusted by the air conditioning system 202 by allowing a user to rotate the dial 302P and notifies the user of the temperature set (changed) by the user operating the dial 302P by displaying the temperature on the display unit 402P. The dial 302V is a wind volume setting dial for setting (changing) a wind volume when air (wind) adjusted by the air conditioning system 202 is sent to the cabin of the vehicle M by allowing a user to rotate the dial 302V and notifies the user of the wind volume set (changed) by the user operating the dial 302V by displaying the wind volume on the display unit 402V. The button 304W is a wind direction switching button for switching (changing) a direction (a wind direction) in which air (wind) adjusted by the air conditioning system 202 by a user pressing the button 304W is sent to the cabin of the vehicle M. The wind direction switched by the button 304W includes directions such as "face," "feet," and "face and feet." The user is notified of the wind direction switched (changed) by the user operating the button 304/W by displaying the wind direction on the display unit 402W. The button 304F is a wind direction switching button for selecting whether a so-called defroster for sending air (wind) adjusted by the air conditioning system 202 toward a front windshield of the vehicle M is to be operated by a user pressing the button 304F. When the user operates the button 304F to select that air (wind) is to be sent to the front windshield, the user is notified thereof, for example, by the display unit 402F including a light emitting device such as a light emitting diode (LED) provided in the button 304F being caused to flicker.

FIG. 2 illustrates an example in which the interface device 500 (the display 502 and the input unit 504) is provided and the selection screen in which the selection buttons for selecting a user of the vehicle M are provided is displayed on the display 502. In the example of the selection screen illustrated in FIG. 2, selection buttons for "user A," "user B," "guest user," and "new registration" are displayed. When a user operates one selection button, a user currently in the vehicle M (that is, a user currently using the vehicle M) is recognized (identified). Here, when the user operates the selection button for "user A," user A who was registered when the user rode in the vehicle M in the past is recognized (identified) as the user currently in the vehicle M. When the user operates the selection button for "user B," user B rather than user A who was registered when the user rode in the vehicle M in the past is recognized (identified) as the user currently in the vehicle M. When the user operates the selection button for "guest user," the user currently in the vehicle M is recognized (identified) as a user who does not normally use the vehicle M (who temporarily uses the vehicle M). When the user operates the selection button for "new registration," the user currently in the vehicle M is recognized (identified) as a user who has not been in the vehicle M in the past and who normally uses the vehicle M from now on. In this case, the in-vehicle equipment control device which is not illustrated displays an input screen for inputting registration names for identifying a user who will be newly registered (for example, "user A," "user B," or the like) on the display 502 and registers information of the registration name for identifying the user who will be newly registered on the basis of the user's operation on the input screen. When the in-vehicle equipment control device which is not illustrated acquires information of the newly registered user (the registration name), the in-vehicle equipment setup device 100 correlates the current new user as a user who newly manages set values of the air conditioning system 202 with the set values of the air conditioning system 202.

In the example illustrated in FIG. 2, a user changes settings or control of the air conditioning system 202 by operating the operation device 300, but the method of changing settings or control of the air conditioning system 202 is not limited to the method of operating the operation device 300. For example, an operation screen in which an operation button, a notification area, or the like to which the same function as the operation device 300 or the notification device 400 is allocated to perform an operation of changing settings or control of the air conditioning system 202 is disposed may be displayed on the display 502, and the settings or control of the air conditioning system 202 may be changed by allowing a user to operate the operation button on the screen of the display 502.

[Configuration of In-Vehicle Equipment Setup Device]

Returning to FIG. 1, the in-vehicle equipment setup device 100 includes, for example, a storage 110, a communicator 120, a setter 130, and an updater 140.

The setter 130 and the updater 140 include, for example, a hardware processor such as a central processing unit (CPU) and a storage device (a storage device including a non-transitory storage medium) storing a program (software), and functions of the constituents are realized by causing the processor to execute the program. Some or all of the constituents may be realized by hardware (a circuit unit including circuitry) such as a large-scale integration (LSI) circuit, an application-specific integrated circuit (ASIC), a field-programmable gate array (FPGA), or a graphics processing unit (GPU) or may be cooperatively realized by software and hardware. Some or all of the constituents may be realized by a dedicated LSI circuit. Here, the program (software) may be stored in a semiconductor memory device such as a read only memory (ROM), a random access memory (RAM), or a flash memory or a storage device (a storage device including a non-transitory storage medium) such as a hard disk drive (HDD) included in the in-vehicle equipment setup device 100 in advance or may be stored in a detachable storage medium (a non-transitory storage medium) such as a DVD or a CD-ROM and installed in the storage device included in the in-vehicle equipment setup device 100 by setting the storage medium into a drive device of the in-vehicle equipment setup device 100. The program (software) may be downloaded from another computer device via a network and installed in the storage device of the in-vehicle equipment setup device 100.

The in-vehicle equipment setup device 100 manages set values of the in-vehicle equipment 200 (the air conditioning system 202 herein) for each user by executing an application managing the set values of the in-vehicle equipment 200 (hereinafter referred to as a "set value management application"). In the following description, the constituents such as the setter 130 and the updater 140 manage the set values of the air conditioning system 202 mounted in the vehicle M for each user by executing the sett value management application, but the operations or processes are assumed to be individually performed by the setter 130 or the updater 140.

For example, user setting information 112 is stored in the storage 110. The user setting information 112 is information in which each user is correlated with information associated with settings (hereinafter referred to as "setting information") desired by the user for the in-vehicle equipment 200 mounted in the vehicle M. The setting information includes information indicating setting items of which settings or control can be changed in the in-vehicle equipment 200 or set values of the setting items. In an initial state of the setting information, initial values or non-set states are correlated as the set values of the setting items. The initial values are, for example, predetermined standard values (default values) for the in-vehicle equipment 200. The non-set indicates, for example, that no set value is set. In the initial state of the user setting information 112, no user is correlated. The user setting information 112 is stored in the storage 110, for example, when a user registers the user himself or herself as a user who uses the vehicle M in an in-vehicle equipment control device which his not illustrated. When a plurality of users who use the vehicle M are registered, the user setting information 112 is stored such that the setting information is correlated with each user.

An example of the user setting information 112 will be described below. FIG. 1 illustrates an example of the user setting information 112 stored in the storage 110. In the user setting information 112 illustrated in FIG. 1, for example, a set value "25° C." of the setting item "temperature," a set value "5" of the setting item "wind volume," and a set value "face" of the setting item "wind direction" are correlated as setting information of the air conditioning system 202 corresponding to user A. In the user setting information 112 illustrated in FIG. 1, for example, a set value "initial value" of the setting item "temperature," a set value "initial value" of the setting item "wind volume," and a set value "initial value" of the setting item "wind direction" are correlated as the setting information of the air conditioning system 202 corresponding to a guest user. Here, the initial value of the setting item "temperature" is, for example, "25° C." The initial value of the setting item "wind volume" is, for example, "3." The initial value of the setting item "wind direction" is, for example, "face and feet." In the user setting information 112 illustrated in FIG. 1, for example, a set value "initial value" of the setting item "temperature," a set value "initial value" of the setting item "wind volume," and a set value "non-set" of the setting item "wind direction" are correlated as the setting information of the air conditioning system 202 corresponding to a user who is newly registered (hereinafter referred to as a "newly registered user"). Here, the initial values of the setting items "temperature" and "wind volume" are the same set values as the initial values of the guest user. On the other hand, the initial value "non-set" of the setting item "wind direction" indicates, for example, that the "wind direction" in the air conditioning system 202 is not set. "Non-set" may indicate, for example, that a set value which is currently set for the air conditioning system 202 is not changed. For example, when the set value of the setting item "wind direction" currently set for the air conditioning system 202 is the set value "feet," the set value of the setting item "wind direction" in the user setting information 112 in an initial state corresponding to the newly registered user may be "feet."

The communicator 120 communicates with the in-vehicle equipment 200. The communicator 120 includes, for example, a communication interface for communication with the in-vehicle equipment 200 (the air conditioning system 202 herein) mounted in the vehicle M via a multiplex communication line such as a controller area network (CAN), a serial communication line, a radio communication network, or the like. In the following description, it is assumed that the communicator 120 communicates with the air conditioning system 202 via the CAN communication line.

The setter 130 sets the in-vehicle equipment 200 on the basis of the user setting information 112 stored in the storage 110. More specifically, when user setting information 112 of a user who is currently in the vehicle M is stored in the storage 110, the setter 130 sets set values indicated by the setting information correlated with the user setting information 112 corresponding to a current user for the in-vehicle equipment 200. That is, the setter 130 sets the set values (hereinafter referred to as "reproduction set values") indicated by the setting information correlated with the user setting information 112 stored in the storage 110 for the in-vehicle equipment 200 in order to reproduce settings or control of the in-vehicle equipment 200 when the current user was previously in the vehicle M. In the following description, the user setting information 112 corresponding to a user who is currently in the vehicle M (that is, a user registered when the user used the vehicle M in the past) out of the user setting information 112 stored in the storage 110 is referred to as "current user setting information 112U" and thus is distinguished from another user stored in the storage 110 (a user who does not currently use the vehicle M). The user who is currently in the vehicle M (the user currently using the vehicle M) is also referred to as a "current user."

The updater 140 acquires current set values set for the air conditioning system 202 via the communicator 120. That is, the updater 140 acquires set values currently set for the air conditioning system 202 (hereinafter referred to as "current set values") through CAN communication between the communicator 120 and the air conditioning system 202. More specifically, the updater 140 acquires current set values after the setter 130 has completed setting for the in-vehicle equipment 200 on the basis of the user setting information 112 (more specifically, the current user setting information 112U). For example, when a current user changes settings or control of the air conditioning system 202 by operating the operation device 300, the updater 140 acquires the changed current set values as new current set values (hereinafter referred to as "changed set values"). Whether settings or control of the air conditioning system 202 has been changed by the current user may be determined, for example, depending on whether a notification from the air conditioning system 202, the operation device 300, or the in-vehicle equipment control device which is not illustrated has been received.

Then, the updater 140 updates the set values (that is, the reproduction set values) included in the setting information correlated with the user setting information 112 with the acquired current set values (including the changed set values). More specifically, the updater 140 updates the set values included in the setting information correlated with the current user setting information 112U with the acquired current set values or the changed set values and stores the updated set values in the storage 110. For example, when the current user setting information 112U is user setting information 112 of a guest user or a newly registered user, set values included in setting information correlated with the current user setting information 112U are "initial values" or "non-set" as described above. The "initial values" or "non-set" are not values for reproducing settings or control of the air conditioning system 202 when the guest user or the newly registered user was previously in the vehicle M, but values for reproducing a predetermined standard state and can be considered to be equivalent to the reproduction set values. Accordingly, even when the set values included in the setting information correlated with the current user setting information 112U are "initial values" or "non-set," the updater 140 updates the set values with the acquired current set values or the changed set values and stores the updated set values in the storage 110.

For example, it is conceivable that CAN communication between the communicator 120 and the air conditioning system 202 not be performed normally for some reasons. That is, it is conceivable that the updater 140 cannot acquire the current set values (including the changed set values) normally. Accordingly, the updater 140 acquires the current set values which are not acquired normally again. When the current set values which are not acquired normally are included in the set values indicated by the setting information correlated with the user setting information 112, the updater 140 repeatedly acquires the current set values. The updater 140 may repeatedly acquire the current set values which are not acquired normally until all the set values indicated by the setting information are updated with the current set values or may repeat the acquisition a predetermined number of times. For example, when the current user setting information 112U is the user setting information 112 of a guest user or a newly registered user, the set values indicated by the setting information correlated with the current user setting information 112U are "initial values" or "non-set." Accordingly, the updater 140 repeatedly acquires the current set values which are not acquire normally until all the set values which are the "initial values" or "non-set" are updated with the current set values.

When the current user setting information 112U is user setting information 112 of a newly registered user, this current user (the newly registered user) is a user who will normally use the vehicle M, and thus the updater 140 preferably repeats acquisition of the current set values until all the set values are updated with the current set values. On the other hand, when the current user setting information 112U is user setting information 112 of a guest user, this current user (the guest user) is a user who temporarily uses the vehicle M, and thus the updater 140 may not repeat acquisition of the current set values until all the set values are updated with the current set values. Accordingly, the updater 140 may stop repeated acquisition of the current set values which are not acquired normally after the acquisition of the current set values has been repeated only a predetermined number of times even when all the set values are not updated with the current set values. However, it is also conceivable that the guest user operates the selection button "new registration" to register the guest user as a newly registered user when the guest user alights from the vehicle M. Accordingly, even when the current user setting information 112U is user setting information 112 of a guest user, the updater 140 preferably repeats acquisition of the current set values until all the set values are updated with the current set values.

Accordingly, the user setting information 112 may be configured to include flag information indicating whether set values have been updated or information indicating an updating date and time, and the updater 140 may determine whether all the set values indicated by the setting information correlated with the user setting information 112 have been updated with the current set values with reference to such information.

Example of Process of Updating User Setting Information in In-Vehicle Equipment Setup Device An example of a process flow of updating user setting information 112 which is performed by the in-vehicle equipment setup device 100 will be described below.

Figure 3:
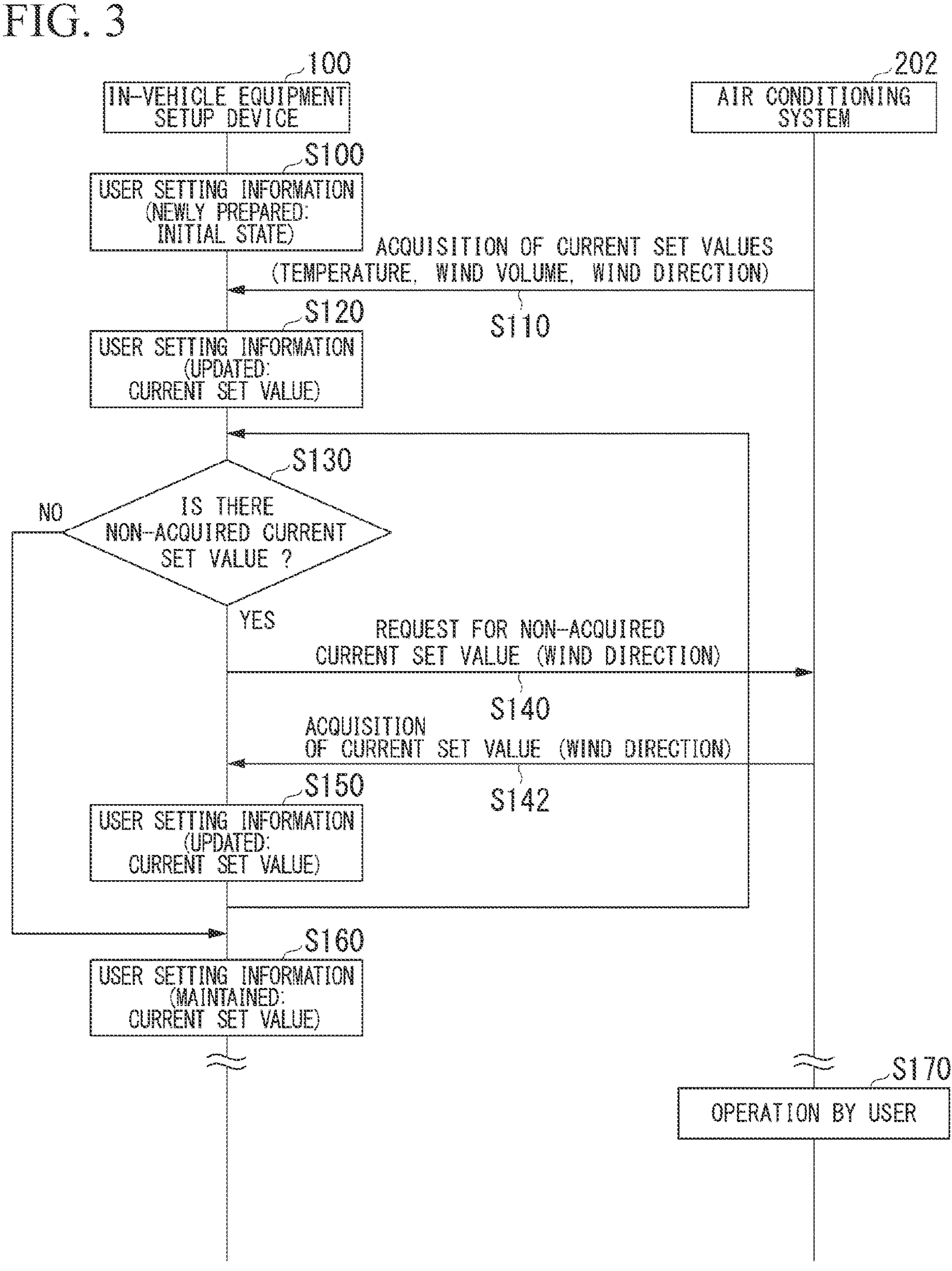
FIG. 3 is a sequence diagram illustrating an example of a process flow of updating user setting information which is performed by the in-vehicle equipment setup device according to the embodiment.

FIG. 3 is a sequence diagram illustrating an example of a process flow of updating user setting information 112 which is performed by the in-vehicle equipment setup device 100 according to the embodiment. FIG. 3 illustrates an example of operations (processes) of the in-vehicle equipment setup device 100 and information (data) exchange through CAN communication performed between the in-vehicle equipment setup device 100 and the air conditioning system 202. The sequence diagram illustrated in FIG. 3 is an example of a process flow when a current user is a newly registered user and the in-vehicle equipment setup device 100 updates user setting information 112 corresponding to the newly registered user.

FIG. 4 is a diagram illustrating an example of user setting information 112 which is updated by the in-vehicle equipment setup device 100 according to the embodiment. In (a) to (c) of FIG. 4, examples of user setting information 112 in process steps which are performed by the in-vehicle equipment setup device 100 illustrated in FIG. 3 are illustrated. In the following description, the process steps performed by the in-vehicle equipment setup device 100 illustrated in FIG. 3 will be described appropriately with reference to the examples of user setting information 112 illustrated in FIG. 4.

When a current user currently in the vehicle M operates the selection button "new registration" and the in-vehicle equipment setup device 100 acquires information (registration name) of a newly registered user from the in-vehicle equipment control device which is not illustrated, first, the updater 140 newly prepares user setting information 112 in an initial state corresponding to the newly registered user as illustrated in (a) of FIG. 4 and stores the prepared user setting information 112 in the storage 110 (Step S100). In (a) of FIG. 4, an example of the user setting information 112 in the initial state in which an "initial value" or "non-set" is correlated with setting information of the air conditioning system 202 is illustrated. More specifically, in the user setting information 112 in the initial state, the set value "initial value" of the setting item "temperature," the set value "initial value" of the setting item "wind volume," and the set value "non-set" of the setting item "wind direction" are correlated as the setting information of the air conditioning system 202 as illustrated in (a) of FIG. 4.

At this time, the setter 130 may set the set values indicated by the setting information correlated with the user setting information 112 in the initial state for the air conditioning system 202. In this case, the set value "initial value" (the set value may include "non-set") is an example of a "reproduction set value."

Thereafter, the updater 140 acquires current set values ("temperature," "wind volume," and "wind direction") from the air conditioning system 202 (Step S110). At this time, the updater 140 causes the communicator 120 to transmit a CAN communication request (a set value request) for requesting information of the current set values to the air conditioning system 202, and acquires the current set values included in a CAN communication response (a set value response) received by the communicator 120 when the air conditioning system 202 transmits the CAN communication response (the set value response) for returning information of the current set values in response to the request from the updater 140. For example, the air conditioning system 202 may be configured to transmit current set values to the updater 140 regardless of whether there is a CAN communication request (a set value request) from the updater 140 at the first time of start (first time) such as when a newly registered user getting in the vehicle M switches an ignition switch (which may be an ignition key) which is not illustrated to an on state (IG_ON) or when a start button (not illustrated) for starting the air conditioning system 202 is pressed.

The updater 140 updates the set values included in the setting information correlated with the user setting information 112 in the initial state with the acquired current set values (Step S120). Then, the updater 140 ascertains whether there is a non-acquired current set value which has not been acquired normally (Step S130). When it is ascertained in Step S130 that there is no non-acquired current set value, the updater 140 causes the process flow to proceed to Step S160.

On the other hand, when it is ascertained in Step S130 that there is a non-acquired current set value, the updater 140 requests the air conditioning system 202 to transmit the non-acquired current set value (Step S140). At this time, the updater 140 causes the communicator 120 to transmit a CAN communication request (a set value request) for requesting information of the non-acquired current set value to the air conditioning system 202.

Here, in Step S110, it is assumed that current set values such as a set value "25° C." of the setting item "temperature," a set value "5" of the setting item "wind volume," and a set value "face" of the setting item "wind direction" have been transmitted from the air conditioning system 202 but the current set value of the setting item "wind volume" has not been acquired normally. In this case, in the user setting information 112 updated by the updater 140 through the process of Step S120, as illustrated in (b) of FIG. 4, the set value "initial value" of the setting item "temperature" in the user setting information 112 in the initial state illustrated in (a) of FIG. 4 is updated with "25° C." and the set value "non-set" of the setting item "wind direction" is updated with "face," but the set value "initial value" of the setting item "wind volume" is maintained at "initial value." In this case, the updater 140 ascertains that there is a non-acquired current set value in Step S130 and causes the communicator 120 to transmit a CAN communication request (a set value request) for requesting information of the current set value of the setting item "wind volume" in Step S140.

When a CAN communication request (a set value request) for requesting information of a non-acquired current set value ("wind volume" herein) is received, the air conditioning system 202 transmits a CAN communication response (a set value response) for returning information of the non-acquired current set value requested by the updater 140. Accordingly, the updater 140 acquires the non-acquired current set value ("wind volume" herein) from the air conditioning system 202 (Step S142).

The updater 140 updaters the non-acquired current set value in the setting information correlated with the user setting information 112 updated through the process of Step S120 with the newly acquired current set value (Step S150). Then, the updater 140 returns the process flow to Step S130 and ascertains whether there is a non-acquired current set value which has not been acquired normally again. When it is ascertained in Step S130 that there is a non-acquired current set value, the updater 140 repeatedly performs the processes of Steps S140 to S150.

Here, in Step S142, it is assumed that a current set value of the set value "5" of the requested setting item "wind volume" has been acquired normally from the air conditioning system 202. In this case, in the user setting information 112 updated by the updater 140 in the process of Step S150, the set value "initial value" of the setting item "wind volume" in the user setting information 112 in the initial state illustrated in (b) of FIG. 4 is updated with "5" as illustrated in (c) of FIG. 4. In other words, the set value "initial value" of the setting item "temperature" in the user setting information 112 in the initial state illustrated in (a) of FIG. 4 is updated with "25° C.," the set value "initial value" of the setting item "wind volume" is updated with "5," and the set value "non-set" of the setting item "wind direction" is updated with "face."

In this case, the updater 140 stores (maintains) the user setting information 112 in which the set values of the setting items are updated with current set values in the storage 110 (Step S160). That is, the updater 140 stores (maintains) the user setting information 112 illustrated in (c) of FIG. 4 in the storage 110. Then, the updater 140 ends this series of processes for updating the user setting information 112.

Thereafter, when the newly registered user operates the operation device 300 to change the current settings or the control state of the air conditioning system 202 (Step S170), the in-vehicle equipment setup device 100 acquires the changed current set values (changed set values) from the air conditioning system 202 and performs the processes of Steps S120 to S160 again. That is, the updater 140 updates the set values included in the setting information correlated with the updated user setting information 112 with the changed set values again.

Through this process flow, the in-vehicle equipment setup device 100 newly prepares the user setting information 112 in the initial state corresponding to the newly registered user, stores the prepared user setting information 112 in the storage 110, and then updates the set values of the user setting information 112 with the current set values acquired from the air conditioning system 202. Accordingly, the in-vehicle equipment setup device 100 can perform management such that the set values for the air conditioning system 202 included in the user setting information 112 become the current set values (which includes the changed set values) when the newly registered user alights from the vehicle M. In other words, the in-vehicle equipment setup device 100 can manage the set values included in the setting information correlated with the user setting information 112 in correlation with a user (the newly registered user herein). Accordingly, when the newly registered user gets in the vehicle M again to use the vehicle M, the in-vehicle equipment setup device 100 can set the settings or the control state of the air conditioning system 202 to the states when the user alighted previously from the vehicle M. This is effective (more convenient) for a user who is registered as a user normally using the vehicle M because the newly registered user does not have to perform an operation of changing the settings or the control state of the air conditioning system 202 to the state when the user got in the vehicle M in the past when the user gets in the vehicle M again.

Another Example of Process of Updating User Setting Information in In-Vehicle Equipment Setup Device In the process of updating the user setting information 112 in the in-vehicle equipment setup device 100 described above with reference to FIGS. 3 and 4, the updater 140 updates user setting information 112 corresponding to a newly registered user. Here, with the user setting information 112 updated and managed by the updater 140 as described above, the settings or the control state of the air conditioning system 202 when a user gets in the vehicle M to use the vehicle M can reproduce the state when the user alighted previously from the vehicle M. The user getting in the vehicle M to use the vehicle M again can change the settings or the control state of the air conditioning system 202 when the user alighted previously from the vehicle M. An example of a process flow of updating the user setting information 112, that is, the current user setting information 112U, which is performed by the in-vehicle equipment setup device 100 in this case will be described below.

Figure 5:
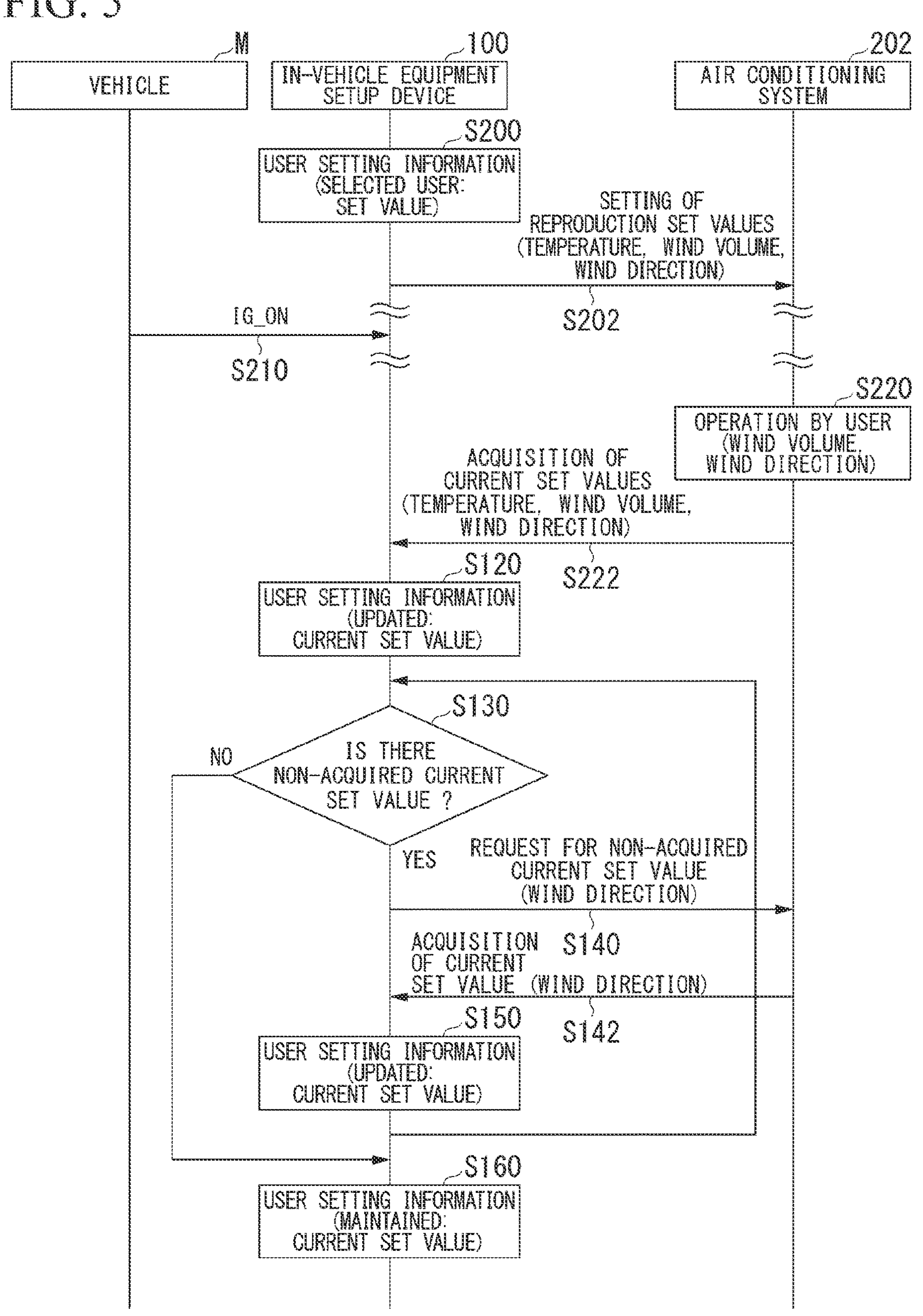
FIG. 5 is a sequence diagram illustrating another example of the process flow of updating user setting information which is performed by the in-vehicle equipment setup device according to the embodiment.

FIG. 5 is a sequence diagram illustrating another example of the process flow of updating user setting information 112 (current user setting information 112U) in the in-vehicle equipment setup device 100 according to the embodiment. In the sequence diagram illustrated in FIG. 5, an example of a process flow of reproducing a state when user A registered when the user got in the vehicle M in the past alighted previously from the vehicle M when user A gets in the vehicle M again and then updating current user setting information 112U when user A (the current user) changes the settings or the control state of the air conditioning system 202 is illustrated. In in FIG. 5, examples of operations (processes) of the in-vehicle equipment setup device 100 and information (data) exchange through CAN communication performed between the in-vehicle equipment setup device 100 and the air conditioning system 202 are illustrated. In the sequence diagram illustrated in FIG. 5, the same processes as those in the sequence diagram illustrated in FIG. 3 are referred to by the same step numbers.

FIG. 6 is a diagram illustrating another example of user setting information 112 (current user setting information 112U) which is updated by the in-vehicle equipment setup device 100 according to the embodiment. In (a) to (c) of FIG. 6, examples of user setting information 112 of user A in process steps which are performed by the in-vehicle equipment setup device 100 illustrated in FIG. 5 are illustrated. In the following description, in order to distinguish the user setting information 112 of user A illustrated in FIG. 6 from the user setting information 112 of a newly registered user illustrated in FIG. 4, the user setting information 112 of user A illustrated in FIG. 6 is referred to as "current user setting information 112Ua." In the following description, the process performed by the in-vehicle equipment setup device 100 illustrated in FIG. 5 will be described appropriately with reference to the examples of the current user setting information 112Ua illustrated in FIG. 6.

When user A gets in the vehicle M and operates the selection button "user A" and the in-vehicle equipment control device which is not illustrated notifies the in-vehicle equipment setup device 100 that user A has been recognized (identified) as a current user, first, the setter 130 reads current user setting information 112Ua corresponding to user A illustrated in (a) of FIG. 6 and stored in the storage 110 from the storage 110 (Step S200). Then, the setter 130 sets the set values indicated by the setting information correlated with the read current user setting information 112Ua as reproduction set values for the air conditioning system 202 (Step S202). In (a) of FIG. 6, an example of the current user setting information 112Ua in which a set value "25° C." of the setting item "temperature," a set value "5" of the setting item "wind volume," and a set value "face" of the setting item "wind direction" are correlated as the setting information of the air conditioning system 202.

Thereafter, for example, user A switches an ignition switch (which may be an ignition key) which is not illustrated to an on state (IG_ON) (Step S210) and drives the vehicle M. At this time, the updater 140 may cause the communicator 120 to transmit a CAN communication request (a set value request) for requesting information of current set values to the air conditioning system 202 and acquire the current set values included a CAN communication response (a set value response) received by the communicator 120 when the air conditioning system 202 transmits the CAN communication response (a set value response) for returning information of the current set values in response to the request from the updater 140. Accordingly, the updater 140 can ascertain whether the set values indicated by the setting information correlated with the current user setting information 112Ua set in the process of Step S202 by the setter 130 are correctly set for the air conditioning system 202. The air conditioning system 202 may be configured to transmit the current set values to the updater 140 regardless of whether there is a CAN communication request (a set value request) from the updater 140 at the first time of start (first time) such as when user A switches the ignition switch which is not illustrated to the on state (IG_ON) or when a start button (not illustrated) for starting the air conditioning system 202 is pressed.

Thereafter, when user A operates the operation device 300 to change the current settings or the current control state of the air conditioning system 202 (Step S220), the updater 140 acquires current set values ("temperature," "wind volume," and "wind direction) including changed current set values (changed set values) from the air conditioning system 202 (Step S222). At this time, the updater 140 may determine that the settings or the control state of the air conditioning system 202 has been changed by user A, for example, by receiving a notification from the air conditioning system 202, the operation device 300, or the in-vehicle equipment control device which is not illustrated. When it is determined that the settings or control of the air conditioning system 202 has been changed, the updater 140 causes the communicator 120 to transmit a CAN communication request (a set value request) for requesting information of the current set values to the air conditioning system 202 and acquires the current set values included in a CAN communication response (a set value response) returned as information of the current set values by the air conditioning system 202 and received by the communicator 120. For example, when the settings or the control state has been changed by user A, the air conditioning system 202 may be configured to transmit the current set values to the updater 140 regardless of whether there is a CAN communication request (a set value request) from the updater 140.

Similar to the processes of the sequence diagram illustrated in FIG. 3, the updater 140 updates the set values included in the setting information correlated with the current user setting information 112Ua with the acquired current set values (Step S120). Then, similarly to the processes of Steps S130 to S150 in the sequence diagram illustrated in FIG. 3, the updater 140 repeatedly acquires a non-acquired current set value until it is ascertained that there is no non-acquired current set value. Finally, similarly to the processes in the sequence diagram illustrated in FIG. 3, the updater 140 stores (maintains) the current user setting information 112Ua in which the set values of the setting items are updated with the current set values in the storage 110 (Step S160) and ends this series of processes of updating the current user setting information 112Ua.

Here, it is assumed that user A changes the set values of "wind volume" and "wind direction" in Step S220. More specifically, it is assumed that user A changes the set value of the setting item "wind volume" to "3" and changes the set value of the setting item "wind direction" to "face and feet (face+feet)." Then, it is assumed in Step S222 that the current set values such as a set value "25° C." of the setting item "temperature," a set value "3" of the setting item "wind volume," and the set value "face+feet" of the setting item "wind direction" are transmitted from the air conditioning system 202, but the current set value of the setting item "wind direction" has not been acquired normally. In this case, in the current user setting information 112Ua updated by the updater 140 in the process of Step S120, as illustrated in (b) of FIG. 6, the set value of the setting item "temperature" in the current user setting information 112Ua illustrated in (a) of FIG. 6 is updated with "25° C." (which is the same before and after the updating) and the set value "5" of the setting item "wind volume" is updated with "3," but the set value "face" of the setting item "wind direction" is kept "fact." In this case, the updater 140 ascertains there is a non-acquired current set value in Step S130, and causes the communicator 120 to transmit a CAN communication request (a set value request) for requesting information of the current set value of the setting item "wind direction" in Step S140.

When a CAN communication request (a set value request) for requesting information of the non-acquired current set value ("wind direction" herein) is received, the air conditioning system 202 transmits a CAN communication response (a set value response) for returning information of the non-acquired current set value requested from the updater 140. Accordingly, the updater 140 acquires the non-acquired current set value ("wind direction" herein) from the air conditioning system 202 (Step S142).

In Step S142, it is assumed that the requested current set value of the set value "face+feet" of the setting item "wind direction" has been acquired normally from the air conditioning system 202. In this case, in the current user setting information 112Ua updated by the updater 140 in the process of Step S150, as illustrated in (c) of FIG. 6, the set value "face" of the setting item "wind direction" in the current user setting information 112Ua illustrated in (b) of FIG. 6 is updated with "face+feet." In other words, the set value "25° C." of the setting item "temperature" is not changed (but the set value is updated) in the current user setting information 112Ua illustrated in (a) of FIG. 6, the set value "5" of the setting item "wind volume" is updated with "3," and the set value "face" of the setting item "wind direction" is updated with "face+feet." Accordingly, the updater 140 stores (maintains) the current user setting information 112Ua illustrated in (c) of FIG. 6 in the storage 110 in Step S160 and ends this series of processes of updating the current user setting information 112Ua.

Thereafter, when the ignition switch which is not illustrated is in the on state and user A (a current user) operates the operation device 300 to change the settings or the control state of the air conditioning system 202, the updater 140 acquires the current set values including the changed current set values (changed set values) from the air conditioning system 202 and performs the processes of Step S120 to S160 again. That is, the updater 140 updates the set values included in the setting information correlated with the updated current user setting information 112Ua with the current set values including the changed set values again.

Through this process flow, the in-vehicle equipment setup device 100 sets the set values in the current user setting information 112Ua of user A (a current user) as reproduction set values for the air conditioning system 202 and then updates the reproduction set values with current set values (changed set values) in which the settings or the control state is changed by user A and which are acquired from the air conditioning system 202. Accordingly, the in-vehicle equipment setup device 100 can perform management such that the set values for the air conditioning system 202 included in the current user setting information 112Ua become the current set values (including the changed set values) when user A alights from the vehicle M. In other words, the in-vehicle equipment setup device 100 can perform management such that the set values of the air conditioning system 202 included in the current user setting information 112Ua become the newest set values normally. Accordingly, the in-vehicle equipment setup device 100 can set the settings or the control state of the air conditioning system 202 when user A gets in the vehicle M to use the vehicle M again to the state when user A alighted previously from the vehicle M. Since user A does not have to perform an operation of changing the settings or the control state of the air conditioning system 202 to the state when user A got in the vehicle M in the past again when user A gets in the vehicle M again, this is effective for a user who is registered as a user who normally uses the vehicle M from now on (convenience for the user is improved).

As described above, with the in-vehicle equipment setup device 100 according to the embodiment, user setting information 112 correlated with each user (each registered user) is stored in the storage 110 and managed. More specifically, in the in-vehicle equipment setup device 100 according to the embodiment, the updater 140 updates the set values indicated by the setting information of the user setting information 112 stored in the storage 110 with current set values (changed set values) acquired from the air conditioning system 202 by CAN communication (which includes requesting information of the current set values and returning a response thereto) between the communicator 120 and the air conditioning system 202. Accordingly, with the in-vehicle equipment setup device 100 according to the embodiment, it is possible to perform management such that the set values of the air conditioning system 202 included in the user setting information 112 correlated with each user become the current set values (including changed set values) when the corresponding user alighted previously from the vehicle M. That is, the in-vehicle equipment setup device 100 according to the embodiment can perform management such that the set values of the air conditioning system 202 included in the user setting information 112 stored in the storage 110 become newest set values normally. Accordingly, the in-vehicle equipment setup device 100 according to the embodiment can set the settings or the control state of the air conditioning system 202 when a user gets in the vehicle M to use the vehicle M to the state when the same user alighted previously from the vehicle M. Accordingly, with the in-vehicle equipment setup device 100 according to the embodiment, since a user does not have to perform an operation of changing the settings or the control state of the air conditioning system 202 to the state when user got in the vehicle M in the past again when the user gets in the vehicle M again, it is possible to appropriately perform setting or control of the air conditioning system 202 for each user (according to a user) and to improve convenience for a user registered as a user who normally uses the vehicle M from now on.

In the aforementioned embodiment, the air conditioning system 202 has been exemplified as the in-vehicle equipment 200. However, this is only an example, and the in-vehicle equipment 200 may include another in-vehicle equipment instead of or in addition to the air conditioning system 202 as described above. For example, the other in-vehicle equipment may be one or more of a power window, a sunroof, a sunshade, an indoor lamp, a map light, a memory seat, a seat heater/cooler, a door lock, a meter, a head-up display (HUD), a driving mode setting device, and a driving support device.

The power window is, for example, a device for opening or closing windshields provided on a driver's seat side, a passenger's seat side, and right and left sides of rear seats of the vehicle M. In this case, the in-vehicle equipment setup device 100 manages set values associated with movement for opening or closing the windshields for each user. The sunroof is, for example, a device for opening or closing a glass or steel panel or the like of an opening provided on the ceiling of the cabin of the vehicle M. In this case, the in-vehicle equipment setup device 100 manages set values associated with movement for opening or closing the opening for each user. The sunshade is, for example, a device for opening or closing a light blocking part that blocks sunlight input from a windshield part on the rear of the vehicle M or right and left windshield parts of the rear seats. In this case, the in-vehicle equipment setup device 100 manages set values associated with movement for opening or closing the light blocking part for each user. Each of the indoor lamp and a map light is, for example, an illumination instrument of the cabin of the vehicle M. In this case, the in-vehicle equipment setup device 100 manages set values associated with turning-on or turning-off of the illumination instrument or brightness at the time of turning-on/off of the illumination instrument for each user. The memory seat is, for example, a seat that can memorize a desired position (so-called seat position) of a user when the user drives the vehicle M by controlling and adjusting a position or height of a seat surface, an angle of a backrest, or the like. In this case, the in-vehicle equipment setup device 100 manages set values associated with the seat position of a driver's seat for each user. The seat heater/cooler is, for example, a device that can control and adjust a temperature adjusting function of a driver's seat (which may include a passenger's seat or rear seats). In this case, the in-vehicle equipment setup device 100 manages set values associated with the seat temperatures for each user. The door lock is, for example, a device for setting activation of a security function which is activated when a user alights from the vehicle M and is separated therefrom. In this case, the in-vehicle equipment setup device 100 manages set values associated with start or activation of the security function for each user. Each of the meter and the HUD is, for example, a device that can set display items such that information desired by a user is displayed. In this case, the in-vehicle equipment setup device 100 manages set values associated with display items to be displayed for each user. The driving mode setting device is, for example, a device for setting various items associated with driving of the vehicle M such that a traveling mode desired by a user when driving the vehicle M is achieved such as a normal traveling mode, a sport traveling mode, and a comfort traveling mode. In this case, the in-vehicle equipment setup device 100 manages various set values associated with driving of the vehicle M such as start, activation, control, and the like of the traveling mode of the vehicle M for each user. The driving support device is, for example, a device for setting various items associated with a driving mode of the vehicle M such that a driving mode desired by a user becomes a driving mode such as automated driving or driving support. In this case, the in-vehicle equipment setup device 100 manages various set values associated with driving support of the vehicle M such as start, activation, control, and the like of the driving mode of the vehicle M for each user.

However, even when the in-vehicle equipment 200 includes another in-vehicle equipment instead of or in addition to the air conditioning system 202, a process equivalent to that in the aforementioned embodiment can be performed as the process of updating user setting information 112 in the in-vehicle equipment setup device 100. Accordingly, detailed description of the processes in the in-vehicle equipment setup device 100 when the in-vehicle equipment 200 includes an in-vehicle equipment than the air conditioning system 202 will be omitted.

With the in-vehicle equipment setup device 100 according to the aforementioned embodiment, it is possible to provide an in-vehicle equipment setup device 100 for correlating setting information on settings for in-vehicle equipment 200 mounted in a vehicle M with each user of the vehicle M, the in-vehicle equipment setup device 100 including: a storage 110 configured to store user setting information 112 in which the setting information desired by each user is correlated with the user; a setter 130 configured to set a set value indicated by the setting information correlated with the user setting information 112 for the corresponding in-vehicle equipment 200; and an updater 140 configured to acquire a current set value which is a set value currently set from the in-vehicle equipment 200 and to update the set value indicated by the setting information correlated with the user setting information 112 with the acquired current set value, wherein the setter 130 sets the set value indicated by the setting information correlated with current user setting information 112U which is the user setting information 112 corresponding to a current user selected as the user who currently uses the vehicle M as a reproduction set value for reproducing previous settings in the corresponding in-vehicle equipment 200 for the corresponding in-vehicle equipment 200, and the updater 140 updates the set value set for the corresponding in-vehicle equipment 200 as the reproduction set value in the setting information correlated with the current user setting information 112U with the acquired current set value. Accordingly, it is possible to appropriately manage settings for the in-vehicle equipment for each user. As a result, in the vehicle M in which the in-vehicle equipment setup device 100 is mounted, it is possible to improve convenience for a user registered as a user who normally uses the vehicle M from now on.

The aforementioned embodiment can be expressed as follows.

An in-vehicle equipment setup device for correlating setting information on settings for in-vehicle equipment mounted in a vehicle with each user of the vehicle, the in-vehicle equipment setup device including:

a hardware processor; and a storage device configured to store a program, wherein the hardware processor reads and executes the program stored in the storage device to perform:

setting a set value indicated by the setting information correlated with current user setting information, which is user setting information corresponding to a current user selected as the user who currently uses the vehicle out of the user setting information which is stored in a storage and in which the setting information desired by each user is correlated with the user, as a reproduction set value for reproducing previous settings for the corresponding in-vehicle equipment for the corresponding in-vehicle equipment;

acquiring a current set value which is a set value currently set from the in-vehicle equipment; and updating the set value set for the corresponding in-vehicle equipment as the reproduction set value in the setting information correlated with the current user setting information with the acquired current set value.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An in-vehicle equipment setup device for correlating setting information on settings for in-vehicle equipment mounted in a vehicle with each user of the vehicle, the in-vehicle equipment setup device comprising:

a processor configured to:

store user setting information in which the setting information desired by each user is correlated with the user;

set a set value indicated by the setting information that is correlated with the user setting information for the corresponding in-vehicle equipment; and acquire a current set value which is a value currently set from the in-vehicle equipment, and update the set value indicated by the setting information that is correlated with the user setting information with the current set value, wherein the processor sets the set value indicated by the setting information that is correlated with current user setting information which is the user setting information corresponding to a current user selected as the user who currently uses the vehicle as a reproduction set value for reproducing previous settings in the corresponding in-vehicle equipment for the corresponding in-vehicle equipment, wherein the processor updates the set value set for the corresponding in-vehicle equipment as the reproduction set value in the setting information correlated with the current user setting information with the current set value, and operates the corresponding in-vehicle equipment, wherein in an absence of a current set value, the processor changes the number of times to repeat an operation of re-acquiring the current set value based on the user being a first user who will continue to use the vehicle or a second user who will temporarily use the vehicle, wherein, when it is ascertained that there is a non-acquired current set value, the processor initiates a request to transmit the non-acquired current set value, the processor acquires the non-acquired current set value, and the processor updates the non-acquired current set value in a setting information correlated with a user setting information updated with a newly acquired current set value, wherein the processor ascertains whether there is a non-acquired current set value which has not been acquired normally again, and wherein the processor stores the user setting information in which set values of setting items are updated with current set values.

2. The in-vehicle equipment setup device according to claim 1, wherein the processor communicates with the in-vehicle equipment and acquires the current set value.

3. The in-vehicle equipment setup device according to claim 2, wherein the processor acquires the current set value after setting the reproduction set value for the corresponding in-vehicle equipment has been completed and updates the set value set for the corresponding in-vehicle equipment as the reproduction set value with the current set value.

4. The in-vehicle equipment setup device according to claim 2, wherein the processor acquires a changed set value which is a changed current set value when the current set value has been changed through a current user's operation on the in-vehicle equipment and updates the set value set for the corresponding in-vehicle equipment as the reproduction set value with the changed set value.

5. The in-vehicle equipment setup device according to claim 4, wherein the reproduction set value includes a set value which is an initial value or a set value in a non-set state in which there is no set value.

6. An in-vehicle equipment setup method that is performed by a computer of an in-vehicle equipment setup device for correlating setting information on settings for in-vehicle equipment mounted in a vehicle with each user of the vehicle, the in-vehicle equipment setup method comprising:

setting a set value indicated by the setting information correlated with current user setting information, which is user setting information corresponding to a current user selected as the user who currently uses the vehicle out of the user setting information which is stored in a storage and in which the setting information desired by each user is correlated with the user, as a reproduction set value for reproducing previous settings for the corresponding in-vehicle equipment for the corresponding in-vehicle equipment;

acquiring a current set value which is a set value currently set from the in-vehicle equipment;

updating the set value set for the corresponding in-vehicle equipment as the reproduction set value in the setting information correlated with the current user setting information with the acquired current set value, and operating the corresponding in-vehicle equipment;

in an absence of a current set value, changing the number of times to repeat an operation of re-acquiring the current set value based on the user being a first user who will continue to use the vehicle or a second user who will temporarily use the vehicle, when it is ascertained that there is a non-acquired current set value, the initiating a request to transmit the non-acquired current set value, acquiring the non-acquired current set value, and the updating the non-acquired current set value in a setting information correlated with a user setting information updated with a newly acquired current set value, ascertaining whether there is a non-acquired current set value which has not been acquired normally again, and storing the user setting information in which set values of setting items are updated with current set values.

7. A non-transitory computer-readable storage medium storing a program, the program causing a computer of an in-vehicle equipment setup device for correlating setting information on settings for in-vehicle equipment mounted in a vehicle with each user of the vehicle to perform:

setting a set value indicated by the setting information correlated with current user setting information, which is user setting information corresponding to a current user selected as the user who currently uses the vehicle out of the user setting information which is stored in a storage and in which the setting information desired by each user is correlated with the user, as a reproduction set value for reproducing previous settings for the corresponding in-vehicle equipment for the corresponding in-vehicle equipment;

acquiring a current set value which is a set value currently set from the in-vehicle equipment;

updating the set value set for the corresponding in-vehicle equipment as the reproduction set value in the setting information correlated with the current user setting information with the acquired current set value, and operating the corresponding in-vehicle equipment;

in an absence of a current set value, changing the number of times to repeat an operation of re-acquiring the current set value based on the user being a first user who will continue to use the vehicle or a second user who will temporarily use the vehicle, when it is ascertained that there is a non-acquired current set value, the initiating a request to transmit the non-acquired current set value, acquiring the non-acquired current set value, and the updating the non-acquired current set value in a setting information correlated with a user setting information updated with a newly acquired current set value, ascertaining whether there is a non-acquired current set value which has not been acquired normally again, and storing the user setting information in which set values of setting items are updated with current set values.

* * * * *